United States Patent Office 3,000,851
Patented Sept. 19, 1961

3,000,851
COMPOSITIONS OF MONOVINYL AROMATIC COPOLYMERS HAVING IMPROVED HEAT RESISTANCE
William K. Schweitzer, Jr., Midland, Mich., assignor to The Dow Chemical Company, Midland, Mich., a corporation of Delaware
No Drawing. Filed Oct. 14, 1957, Ser. No. 689,776
8 Claims. (Cl. 260—45.9)

This invention relates to novel compositions of copolymers prepared principally from monovinyl aromatic monomers together with small but significant amounts of carboxylic, olefinically-unsaturated comonomers. More particularly it relates to such compositions exhibiting improved thermal resistance, especially as evidenced by increased heat distortion temperatures. The term "heat distortion temperature," for purposes of this application should be construed as that temperature resulting when a sample of specified dimensions is loaded in a prescribed manner and heated at a fixed rate until the sample is deformed to a stated value. Such a test method is described in A.S.T.M. Tentative Method of Test for Heat Distortion Temperature of Plastics (D–648–44T) in the 1944 Book of A.S.T.M. Standards, part III, pg. 1627. The heat distortion temperature has become one of the most common characterizing properties of polymers and copolymers.

The copolymers of monovinyl aromatic monomers, such as styrene, with carboxylic olefinically-unsaturated comonomers, such as acrylic acid, have been known for a long time. Those copolymers were characterized by having heat distortion temperatures which were at least as great and usually greater than the corresponding homopolymer of the monovinyl aromatic monomer. However, as is generally true in the high polymer art, it is necessary to formulate a multi-component system based on the polymer to achieve commercially successful articles. For example pigments, plasticizers, stabilizers, fillers, and like additives are incorporated into the formulation to enhance a particular property or characteristic. When additives are so used, the heat distortion temperature of the article prepared from the formulation drops significantly. As a result, much of the advantage accrued by use of the copolymer is lost. The temperatures required for the thermal fabrication of the copolymers, exemplified by the styrene-acrylic acid copolymer, are very high requiring great heat input and/or relatively long molding cycles. The prior known plasticizers may be used to lower the fabrication temperature, but only at the expense of reduced heat distortion temperatures. With the increasing number of applications of articles fabricated from polymeric formulations, it was inevitable that improved properties, such as increased heat distortion temperatures, and lower fabrication temperatures would be required. Some, but not all, of the problems involved may be met by resort to copolymerization techniques. This is for the reason that the utilization of a comonomer usually eventually detracts from other properties of the copolymer in addition to its thermal resistance and heat distortion characteristics. Besides, a change in copolymerization entails more than merely varying the feedstock of the monomeric constituents being polymerized. Many other variables, such as rate of polymerization, temperature, heat of polymerization and others, must be determined and translated into the operating conditions for the particular equipment employed. The copolymers of monovinyl aromatic monomers and carboxylic, olefinically-unsaturated comonomers are potentially useful as base materials for fabricating a wide variety of articles. However, it would be desirable to lower their fabrication temperature while raising, or at least not lowering, the heat distortion temperatures.

The provision of a composition based upon these copolymers having lowered fabrication temperatures and raised heat distortion temperatures is the principal object of this invention.

It is a further object to provide such a composition based on the copolymer and certain additives.

The above and related objects are accomplished by means of a composition comprising (1) a copolymer prepared from a monomeric mixture consisting essentially of a monovinyl aromatic monomer together with from about 0.5 to about 30 percent by weight of a carboxylic, olefinically-unsaturated comonomer and (2) from about 0.25 to about 2.0 percent based on the weight of said copolymer of a compound which contains at least two substituents capable of hydrogen bonding with the pendant carboxyl groups of said copolymer and which will not react with said carboxyl groups to form a covalent bond.

The copolymers contemplated as useful in the compositions of this invention are those containing recurring units of polymerized monovinyl aromatic monomers and also containing in the same copolymer chain recurring units of copolymerized monomers having pendant carboxyl groups. Among the monovinyl aromatic monomers, styrene is preferred, although other compounds, such as para-methyl styrene, meta-ethyl styrene, ortho-para-dimethyl styrene, ortho-para-diethyl styrene, para-chlorostyrene, isopropyl styrene, ortho-methyl-para-isopropyl styrene, or ortho-para-dichloro styrene, or comonomeric mixtures of styrene with alpha-methyl styrene or of styrene with any of the above-named compounds may be used. Comonomeric mixtures of styrene or of the aforementioned compounds with other monoethylenically unsaturated monomers, such as the alkyl acrylates and alkyl methacrylates, may also be used. The term "monovinyl aromatic monomer" as used herein is intended to include the compounds having the vinyl radical directly attached to a carbon atom of an aromatic nucleus, which compounds may also contain one or more alkyl or halogen atoms as nuclear substituents. The useful copolymers should be composed predominantly of monovinyl aromatic monomer units. By "predominantly" is meant that the monovinyl aromatic units should form at least 50 percent by weight and preferably at least 70 percent by weight of the molecular structure of the copolymer. When the monovinyl aromatic monomer is the sole monomer copolymerized with the carboxyl-containing monomer. It must make up at least 70 percent by weight of the structure of the copolymer. When the polymeric material is a ternary or quaternary polymer containing, for example, an alkyl acrylate in addition to the two essential comonomers, the concentration of monovinyl aromatic monomer must make up at least about 50 percent by weight of the structure of the copolymer.

The carboxylic, olefinically-unsaturated monomer may be selected from a wide variety of monomeric compounds. This monomer must contain at least one carboxyl group or, alternatively, at least one group capable by simple hydrolysis of conversion to a carboxyl group. Thus, anhydrides may be used in the polymerization of the copolymer, and the anhydride function subsequently hydrolyzed to its carboxyl counterpart. Because hydrolysis adds an extra step in the preparation of the copolymer useful in the composition, it is preferred to employ the acid in the polymerization where applicable. It should be understood, however, that the compositions require only that carboxyl groups be present in the molecule and that they do not depend on the polymerization procedure used in preparing the copolymer.

The carboxylic, olefinically-unsaturated monomer also should be monoethylenically unsaturated. Monomers containing more than one site of olefinic unsaturation are subject to considerable cross-linking with resultant loss of thermoplasticity, solubility, and other properties to the extent that the cross-linked copolymer appears to be completely unrelated to the linear, non-cross-linked copolymer of similar composition. It is the linear copolymers as evidenced by thermoplasticity which are contemplated within the invention.

Typical examples of useful carboxylic, olefinically-unsaturated monomers are acrylic acid, alpha-alkyl acrylic acid, such as methacrylic acid, alpha-haloacrylic acid, maleic acid, itaconic acid, crotonic acid, and vinyl benzoic acid.

The carboxylic, olefinically-unsaturated monomer should be present in the molecular structure of the copolymer in a concentration of from about 0.5 to about 30 percent of the weight of the copolymer. There is no significant benefit achieved with the compositions of this invention when the base polymer contains less than 0.5 percent of the carboxylic monomer. Copolymers containing appreciably more than 30 percent of carboxylic monomer are difficult and expensive to prepare and the advantage obtained from those compositions employing such copolymers is not proportional to that obtained when smaller amounts of carboxylic monomer are used. In addition the advantages are at least partially off-set by the increased corrosive tendencies of the monomers which raise the costs of polymerization, and by the change in properties of such copolymers.

The copolymers may be prepared by known polymerization techniques. Thus the monomers may be caused to polymerize in mass or in bulk as well as in aqueous suspension or emulsion or in non-aqueous solution. In those methods the monomers are initially mixed, dispersed in a dispersant or solvent, if desired, and subjected to the usual catalytic and thermal conditions known to induce polymerization. After polymerizing to substantial completion the polymer is isolated and dried. If a copolymer of increased compositional homogeneity is desired, the polymerization process described in the copending application of John L. Lang filed January 30, 1957 as U.S. Serial No. 637,062, now U.S. Patent No. 2,967,855, may be employed. In that process the monomeric materials are heated in bulk or in the substantial absence of other polymerizable substances, soluble diluents, or soluble dispersants, at a pressure sufficient to preserve the liquid state, at a temperature of from about 130° C. or higher when uncatalyzed or somewhat lower when catalyzed while feeding to the mixture the monomeric materials at a rate and in a proportion such as to maintain in the mixture a constant ratio of the monomeric materials to each other and to maintain the proportion of copolymer in the mixture constant at not more than about 50 percent by weight. In actual operation the process consists of continuously adding monomeric materials to while simultaneously withdrawing copolymer from the equilibrium polymerizing mixture. By means of that process the closest approach to theoretical alternating tendency is realized and the result is a copolymer of highly uniform and reproducible properties and characteristics.

The additives which are useful in the compositions of the invention are those organic compounds containing at least two substituents capable of hydrogen bonding with the pendant carboxyl groups of the copolymer above described, but also which will not react with said corboxyl groups to form a covalent bond. Among the substituent groups contemplated in the invention are nitro, nitroso, cyano, phenolic hydroxyl and carboxyl groups. Other groups will be apparent to the skilled worker. The bridging portion of the additive which separates the functional substituents may be of any configuration providing that that bridging portion does not contain other groups, such as chelating groups, which would tend to nullify the hydrogen bonding potential of the additive. Typical examples of the useful compounds are para-dinitrobenzene, hydroquinone, and dibasic carboxylic acids, such as succinic, glutaric, adipic, pimelic, sebacic, and azelaic acids. All of these listed compounds are characterized by containing groups of high electron density permitting of the requisite hydrogen-bonding property. Among the compounds expressly excluded from the scope of the invention are amines and alcohols which are known to react with carboxyl groups.

The additives should be employed in the compositions in a concentration of from about 0.25 to about 2.0 percent by weight based on the copolymer employed in the composition and preferably in a concentration of from 1 to 2 percent by weight. The actual amount required to arrive at a given result, such as a predetermined heat distortion temperature or a predetermined fabrication temperature, will vary somewhat depending upon the nature of the additive and the percentage of carboxyl function in the copolymer. The optimum concentration in any case is easily determined by simple preliminary experiment. With any of the additives there is no significant improvement or change evidenced in the compositional properties when less than 0.25 percent of additive is used. When appreciably more than 2 percent is employed there is little additional improvement noticed in the compositional properties and what change there may be is insufficient to justify the added expense of the additive. In addition when large amounts of any additive are incorporated into a polymer formulation the properties, such as strength of an article prepared therefrom which are dependent upon the polymer, may be lessened.

The compositions may be prepared by known blending procedures, such as dry mixing, milling, kneading, and the like. It is usually most convenient in formulating polymer compositions to premix all non-polymeric additives and to blend that premix into the polymer. The compositions may be processed in the usual manner by pelletizing, grinding, or subjecting them to any other process.

The compositions are well adapted for thermal fabrication operations, such as extrusion, injection and compression molding, and the like. Although the heat distortion temperature is raised over that of an unmodified composition, and the fabrication temperature is lowered, the other theological properties are not significantly altered.

The additives of this invention may be used in conjunction with the other common additives, such as stabilizers, fillers, pigments, dyes, and plasticizers, employed in polymer formulations.

The advantages of the compositions will be more apparent from the following illustrative examples wherein all parts and percentages are by weight.

EXAMPLE 1

A copolymer containing 86 percent styrene and 14 percent methacrylic acid as determined by infra-red analysis was mechanically milled for 10 minutes on a two roll mill with 1 percent of an additive. The front roll was at a temperature of about 345° F. and the rear roll at about 220° F. Several such compositions were prepared using various additives as listed in the following table. Heat distortion temperatures were determined by A.S.T.M. method D648–44T, described earlier as modified by the method described in A.S.T.M. Bulletin No. 134, May 1945. In that method a compression molded sample is cut into a test specimen having dimensions of 1.75 by 0.5 by 0.375 inch. The load is applied until a given deformation is obtained. That temperature is the heat distortion temperature. The results are listed in the following table.

The fabrication temperature is that temperature which is 25° F. above the temperature at which a mold will just fill when a ram pressure of 10,000 pounds per square inch is applied.

Table I

| Additive | Heat Distortion, °C. | Fabrication Temperature, °F. |
|---|---|---|
| None (milled) | 110 | 535 |
| None (unmilled) | 110 | 550 |
| para-dinitro benzene | 112 | 520 |
| hydroquinone | 112 | 525 |
| succinic acid | 113 | 525 |

The results show the increase in heat distortion temperatures and the decrease in fabrication temperatures obtained by these compositions.

EXAMPLE 2

A copolymer containing 96 percent styrene and 4 percent methacrylic acid by infra-red analysis was mechanically melted with 1 percent of one of the additives listed below on compounding rolls for 10 minutes. The front roll was at a temperature of about 380° F. and the rear roll at about 180° F. The compositions had the following unannealed heat distortion temperatures and fabrication temperatures as determined by the methods of Example I.

Table II

| Additive | Fabrication Temperature, °F. | Heat Distortion, °C. |
|---|---|---|
| None (unmilled) | 490 | 90 |
| None (milled) | 480 | 89 |
| Pimelic aicd | 475 | 98 |
| Glutaric acid | 475 | 95 |
| Sebacic acid | 480 | 92 |
| Azelaic acid | 480 | 95 |
| Succinic acid | 475 | 94 |
| Adipic acid | 475 | 92 |

The heat distortion temperature is raised more than 10 percent over that of an unmodified blank.

Similar results were obtained when the same compositions were prepared using a copolymer of styrene and acrylic acid.

I claim:

1. A thermoplastic composition comprising a homogeneous blend of (1) a copolymer prepared from a monomeric mixture consisting essentially of a monovinyl aromatic monomer of the benzene series together with from about 0.5 to about 30 percent by weight of a comonomeric monoethylenically unsaturated carboxylic acid and (2) from 0.25 to about 2.0 percent of the weight of said copolymer of an additive compound containing at least two substituent groups capable of hydrogen bonding with the pendant carboxyl groups of said copolymer and which contains no groups which react with carboxyl groups of said copolymer to form a covalent bond.

2. The composition claimed in claim 1 wherein said monoethylenically-unsaturated, carboxylic acid is acrylic acid.

3. The composition claimed in claim 1 wherein said monoethylenically-unsaturated, carboxylic acid is methacrylic acid.

4. The composition claimed in claim 1 wherein said monovinyl aromatic monomer is styrene.

5. The composition claimed in claim 1 wherein said additive compound contains two hydrogen-bonding substituents.

6. The composition claimed in claim 5 wherein said additive compound is a dicarboxylic aliphatic acid.

7. The composition claimed in claim 5 wherein said additive compound is para-dinitrobenzene.

8. The composition claimed in claim 5 wherein said additive compound is hydroquinone.

References Cited in the file of this patent

UNITED STATES PATENTS

| 2,287,188 | Matheson et al. | June 23, 1942 |
| 2,627,510 | Parker | Feb. 3, 1953 |
| 2,816,827 | Roth | Dec. 17, 1957 |